United States Patent Office 3,494,889
Patented Feb. 10, 1970

---

3,494,889
BISPHENOL-EPICHLOROHYDRIN RESINS CURED WITH ALKYLIDENEBIS ($\alpha,\alpha'$ - DIAMINO - 2,6-XYLENOLS)
Thomas J. Hairston, Angleton, and Jerry M. Hawkins and Stephen P. Edwards, Lake Jackson, Tex., assignors to The Dow Chemical Company, Midland, Mich., a corporation of Delaware
No Drawing. Original application July 26, 1965, Ser. No. 474,973, now Patent No. 3,400,154. Divided and this application Apr. 24, 1968, Ser. No. 737,247
Int. Cl. C08g 30/14
U.S. Cl. 260—47                    4 Claims

ABSTRACT OF THE DISCLOSURE

An alkylidenebisphenol is reacted with formaldehyde and ammonia or a primary aliphatic amine to make the corresponding alkylidenebis ($\alpha,\alpha'$-diamino - 2,6 - xylenol). These new compounds are useful as curing agents for epoxy resins, particularly those derived from the reaction product of epichlorohydrin and bisphenol A. The cured resins have high heat distortion values.

---

This is a division of our copending application Ser. No. 474,973 filed July 26, 1965, now Patent No. 3,400,154.

This invention pertains to new chemical compounds and to resinous compositions containing them. The invention relates particularly to a class of new aminated bisphenols and to polyepoxide resins cured through the action of these compounds.

These new compounds have the general formula

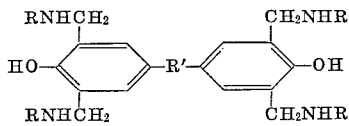

where R is hydrogen, methyl, ethyl, n-phopyl, n-butyl, or alkenyl of 3–4 carbon atoms and R' is alkylidene of 1–8 carbon atoms. Preferably R is methyl or ethyl and R' is isopropylidene. These compounds are most readily prepared by a Mannich type reaction in which the parent bisphenol is reacted at about room temperature with approximately the stoichiometric quanties of formaldehyde and ammonia or the appropriate primary amine. Paraformaldehyde can be used in place of formaldehyde. The reaction is conventiently carried out in aqueous or lower alkanolic solution to produce near quantitative yields of the water-insoluble products.

Related known compounds include disubstituted bisphenols similar to the above tetrasubstituted compounds where R in the analogous general formula is tertiary alkyl, higher primary alkyl, or polyaminoalkylene. Other known compounds are the tertiary amines formed by substituting a secondary amine for the primary amine in the above-described preparative procedure. The compounds of the present invention have been found to have unexpected advantages over the prior art compounds as curing and hardening agents for epoxy resins, particularly those resins derived from epichlorohydrin and alyklidene-bisphenols of the class from which these amino compounds are made, for example, p,p'-isopropylidenediphenol.

Other types of polyamines previously used as curing agents for epoxy resins include aromatic amines such as methylene dianiline and aliphatic compounds such as diethylenetriamine. The aromatic amines provide cured resins having a high heat distortion temperature while the aliphatic amines of the type of diethylene-triamine offer rapid curing of epoxy resins at relatively low temperatures. The compounds of this invention combine the advantageous qualities of both of the above types of curing agents, for they are condensation products of an aromatic compound with an aliphatic amine. As compared to more closely related known compounds as described above, these new compounds provide cured epoxy resins having substantially improved heat distortion temperatures, in some instances as much as 100° F. higher than those of resins obtainable through use of said related known compounds. For such curing and hardening action, these amines can be used in catalytic amounts, but they are preferably employed in about stoichiometric proportions of one amino hydrogen atom to one epoxide group. In such proportions, the amine becomes a substantial part of the polymeric structure, thereby serving as a chain lengthening and crosslinking body. Effective curing temperatures are in the range of 100–200° C.

The above general formula includes compounds made by reacting formaldehyde with ammonia or an amine such as methylamine, ethylamine, n-propylamine, n-butylamine, allylamine, methallylamine, and crotylamine and a bisphenol derived from phenol and an aliphatic aldehyde or ketone of 1–8 carbon atoms. Representative alkanals and alkanones include formaldehyde, acetaldehyde, butyraldehyde, 2-ethylhexanal, acetone, methyl ethyl ketone, 2-hexanone, and 2-octanone. Amino compounds such as 4,4'-methylenebis($\alpha,\alpha'$-diamino-2,6-xylenol),
4,4'-propylidenebis($\alpha,\alpha'$-bis(methylamino)-2,6-xylenol),
4,4'-propylidenebis($\alpha,\alpha'$-bis(n-butylamino)-2,6-xylenol),
4,4'-sec-butylidenebis($\alpha,\alpha'$-bis(allylamino)-2,6-xylenol),
4,4'-isopropylidenebis($\alpha,\alpha'$-bis(methallyamino)-2,6-xylenol),
4,4'-hexylidenebis($\alpha,\alpha'$-diamino-2,6-xylenol), and
4,4'-(1-methylheptylidene)bis($\alpha,\alpha'$-bis(methylamino)-2,6-xylenol)

are easily prepared in this way. Amino compounds derived from p,p'-isopropylidenediphenol are preferred.

EXAMPLE 1

A mixture of 1.0 g. mole of p,p'-isopropyl-idenediphenol 4.4 g. moles of methylamine, and 900 ml. of water was stirred together until nearly all of the bisphenol had disolved. At that time 4.0 g. moles of formaldehyde in 37% water solution was added slowly to the stirred mixture maintaining the reaction temperature below about 40° C. Stirring was continued until precipitation of the solid product began. The reaction mixture was then allowed to stand until precipitation of the product was completed, the water layer was decanted, and the washed product was dried in a vacuum oven. The product was a tan solid melting at 104–106° C. Analytical examination of the product showed it to be 4,4'-isopropylidenebis ($\alpha,\alpha'$-bis(methylamino) - 2,6 - xylenol). Molecular weight, found 397, calc. 400; amine hydrogen equivalent weight, found 104, calc. 100; and phenolic hydroxyl equivalent weight, found 201, calc. 200.

EXAMPLE 2

By the procedure of Example 1, 114 g. of p,p'-isopropylidenediphenol was dissolved in a solution of 126 g. of allylamine in 500 ml. of water and 162 g. of 37% aqueous formaldehyde was added to the solution. The product which separated from the reaction mixture was a black viscous liquid which polymerized when heated. Analysis showed the product to be 4,4'-isopropylidenebis($\alpha,\alpha'$-bis(allylamino)-2,6-xylenol). Molecular weight, found 518, calc. 504; amine hydrogen equivalent weight, found 126, calc. 126.

EXAMPLE 3

In the same way, 162 g. of 37% aqueous formaldehyde was added to a solution of 114 g. of p,p'-isopropylidenediphenol in 1.1 liters of dilute aqueous ammonia containing 31 g. of $NH_3$. The product was a reddish-black solid melting at 218–224° C. It was found to have a molecular weight of 360 as compared to the theoretical value of 344. This material was the expected 4,4'-isopropylidenebis ($\alpha,\alpha'$-diamino-2,6-xylenol).

EXAMPLE 4

As shown in Example 1, p,p'-isopropylidenediphenol was reacted in aqueous medium with four mole equivalents of formaldehyde and 2.2 mole equivalents of n-propylamine. The brown solid product was identified as 4,4'-isopropylidenebis($\alpha,\alpha'$ - bis(propylamino) - 2,6-xylenol). Molecular weight, found 540, calculated 512; amine hydrogen equivalent weight found 124, calculated 128.

EXAMPLE 5

By reacting p,p'-isopropylidenediphenol with ethylamine and formaldehyde as shown above, 4,4'-isopropylidenebis($\alpha,\alpha'$ - bis(ethylamino) - 2,6 - xylenol) is obtained as a tan solid with properties closely similar to those of the products of Examples 1 and 4.

EXAMPLE 6

By the procedure of Example 1, 114 grams of p,p'-isopropylidenediphenol was dissolved in a solution of 161 g. of n-butyl amine in 600 grams of water and 162 grams of 37% aqueous formaldehyde was added to the solution. The product which separated from the reaction mixture was a brown amorphous solid. Analysis showed the product to be 4,4'-isopropylidene-bis($\alpha,\alpha'$-bis-(n-butylamino)-2,6-xylenol). Molecular weight, found 520, calc. 556; amine hydrogen equivalent weight, found 148, calc. 139.

EXAMPLE 7

For the purpose of comparison, homologs of the compounds of the above examples were made by reacting p,p'-isopropylidenediphenol and formaldehyde with tert-butylamine and n-octylamine respectively by the procedure of Example 1. Samples of an uncured epoxy resin based on p,p'-isopropylidenediphenol and epichlorohydrin were mixed at 120° C. with stoichiometrically equivalent amounts of the various amine compounds and the mixtures were cast into ½ x ½ x 6 inch sticks. These were cured for 48 hours at 150° C. and tested for heat distortion by the procedure of ASTM–D648–56.

| Parent amine: | Cured resin heat distortion temp.[1] ° F. |
|---|---|
| Methylamine | 298 |
| n-Propylamine | 261 |
| n-Butylamine | 252 |
| Tert-butylamine | 232 |
| n-Octylamine | 196 |

[1] Average of four samples each.

We claim:

1. A cured epoxide resin composition obtained by heating at 100°–200° C. a mixture of a curable epoxide resin derived from epichlorohydrin and an alkylidenebisphenol wherein the alkylidene group contains 1–8 carbon atoms and about a stoichiometric quantity of a compound of the formula

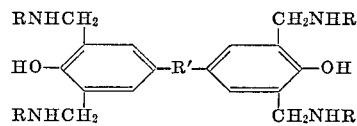

wherein R' is alkylidene of 1–8 carbons and R is selected from the group consisting of hydrogen, primary alkyl of 1–4 carbon atoms and alkenyl of 3–4 carbon atoms.

2. The cured epoxide resin composition obtained by heating at 100°–200° C. a mixture in about stoichiometric proportions of 4,4'-isopropylidenebis ($\alpha,\alpha'$-bis(methylamino)-2,6-xylenol) and the curable reaction product of epichlorohydrin and p,p'-isopropylidenediphenol.

3. The cured epoxide resin composition obtained by heating at 100°–200° C. a mixture in about stoichiometric proportions of 4,4'-isopropylidenebis ($\alpha,\alpha'$-bis(propylamino)-2,6-xylenol) and the curable reaction product of epichlorohydrin and p,p'-isopropylidenediphenol.

4. The cured epoxide resin composition obtained by heating at 100°–200° C. a mixture in about stoichiometric proportions of 4,4' - isopropylidenebis($\alpha,\alpha'$ - bis(butylamino)-2,6-xylenol) and the curable reaction product of epichlorohydrin and p,p'-isopropylidenediphenol.

References Cited

UNITED STATES PATENTS 3,285,991    11/1966    Sellers.

WILLIAM H. SHORT, Primary Examiner

T. PERTILLA, Assistant Examiner